US010508723B2

(12) United States Patent
Kim (10) Patent No.: US 10,508,723 B2
(45) Date of Patent: Dec. 17, 2019

(54) REDUCER OF ELECTRIC POWER STEERING APPARATUS (71) Applicant: MANDO CORPORATION, Gyeonggi-do (KR)

(72) Inventor: Hyoung Woo Kim, Seoul (KR)

(73) Assignee: MANDO CORPORATION, Gyeonggi-Do (KR)

( * ) Notice: Subject to any disclaimer, the term of this patent is extended or adjusted under 35 U.S.C. 154(b) by 124 days.

(21) Appl. No.: 15/719,542

(22) Filed: Sep. 28, 2017

(65) Prior Publication Data
US 2018/0100567 A1 Apr. 12, 2018

(30) Foreign Application Priority Data

Oct. 10, 2016 (KR) .................. 10-2016-0130912

(51) Int. Cl.
*F16H 35/06* (2006.01)
*B62D 5/04* (2006.01)
*F16H 1/16* (2006.01)
*F16H 57/12* (2006.01)
*F16H 57/021* (2012.01)
*F16H 57/022* (2012.01)

(52) U.S. Cl.
CPC ............ *F16H 35/06* (2013.01); *B62D 5/0409* (2013.01); *F16H 1/16* (2013.01); *F16H 57/12* (2013.01); *F16H 2057/0213* (2013.01); *F16H 2057/0222* (2013.01); *F16H 2057/126* (2013.01)

(58) Field of Classification Search
CPC .... F16H 35/06; F16H 2057/0213; F16H 1/16; F16H 55/24; F16H 55/28; F16H 35/08; F16H 57/12; B62D 5/0454

USPC ................................. 74/89.14, 425
See application file for complete search history.

(56) References Cited

U.S. PATENT DOCUMENTS 6,527,642 B1 * 3/2003 Arai ..................... B62D 5/0409
464/104
2011/0067946 A1 * 3/2011 Kim ..................... B62D 5/0409
180/444

FOREIGN PATENT DOCUMENTS

CN 102030032 4/2011
CN 104417602 3/2015
(Continued)

OTHER PUBLICATIONS

Office Action dated Sep. 2, 2019 for Chinese Patent Application No. 201710933807.4 and its English translation by Google Translate.

*Primary Examiner* — David M Fenstermacher
*Assistant Examiner* — Randell J Krug
(74) *Attorney, Agent, or Firm* — Ladas & Parry, LLP (57) ABSTRACT Embodiments disclosed herein relates to a reducer of an electric power steering apparatus. The embodiments provide a reducer of an electric power steering apparatus that includes: a worm shaft having a first end connected to a motor shaft and a second end that is opposite the first end, in which a first worm shaft bearing and a second worm shaft bearing are coupled to the first end and the second end, respectively; a gear housing in which the first worm shaft bearing, the second worm shaft bearing, and the worm shaft are housed; and a moisture absorption compensation member which is supported on and coupled to an inner circumferential surface of the gear housing in a direction in which the worm shaft meshes with the worm wheel and supports the worm shaft in a direction opposite the direction in which the worm shaft meshes with the worm wheel.

12 Claims, 9 Drawing Sheets

(56) References Cited

FOREIGN PATENT DOCUMENTS

| CN | 205078745 | 3/2016 |
| CN | 105782402 | 7/2016 |
| CN | 105889419 | 8/2016 |
| EP | 0 509 263 | 10/1992 |
| KR | 10-2011-0061917 | 6/2011 |

* cited by examiner

REDUCER OF ELECTRIC POWER STEERING APPARATUS

CROSS REFERENCE TO RELATED APPLICATION

This application claims priority from Korean Patent Application No. 10-2016-0130912, filed on Oct. 10, 2016, which is hereby incorporated by reference for all purposes as if fully set forth herein.

BACKGROUND OF THE INVENTION

1. Field of the Invention

Embodiments disclosed herein relate to a reducer of an electric power steering apparatus. More particularly, the present disclosure relates to a reducer of an electric power assist steering apparatus that is provided with a moisture absorption compensation member to be capable of solving the problem of moisture absorption of a worm wheel and the problems caused thereby.

2. Description of the Prior Art

The conventional reducer of the electric power steering apparatus has a problem in that when the worm and the worm wheel, which are rotated by the driving of the motor, are aged, rattle noise is generated due to backlash and the clearance occurring by the wear and tear of the worm and the worm wheel. In addition, there is a problem in that the rattle noise is generated more severely by the load input reversely from a wheel when traveling on the rough road.

Further, the worm is made of a metal, such as steel while the worm wheel is entirely or partially (outer peripheral portion) made of a plastic material in order to cope with the frictional resistance with the worm. When the vehicle is operated in a high temperature and high humidity area, the worm wheel made of the plastic absorbs moisture and is expanded so that the dimension of the worm wheel is changed to increase torque, resulting in a heavy steering feeling for the driver, and deterioration of the performance.

SUMMARY OF THE INVENTION

Therefore, embodiments disclosed herein have been conceived under the above-described background, and an object of the embodiments is to provide a reducer of an electric power steering apparatus in which, by minimizing an increase in torque due to moisture absorption of the worm wheel and the resulting deformation of the worm wheel, the steering feeling of the driver and the performance of the reducer may be prevented from deteriorating, a clearance may be prevented from occurring due to the wear and tear of the worm and the worm wheel, and rattle noise may be prevented from being generated by backlash and a reverse input load.

In addition, the objects of the embodiments disclosed herein is not limited to thereto, and other objects, which are not described above, may be clearly understood by a person ordinarily skilled in the art from the following description.

In order to achieve these objects, the embodiments provide a reducer of an electric power steering apparatus that includes a worm shaft having a first end connected to a motor shaft and a second end that is opposite the first end, in which a first worm shaft bearing and a second worm shaft bearing are coupled to the first end and the second end, respectively; a gear housing in which the first worm shaft bearing, the second worm shaft bearing, and the worm shaft are housed; and a moisture absorption compensation member which is supported on and coupled to an inner circumferential surface of the gear housing in a direction in which the worm shaft meshes with the worm wheel and supports the worm shaft in a direction opposite the direction in which the worm shaft meshes with the worm wheel.

According to the embodiments described above, by minimizing an increase in torque due to moisture absorption of the worm wheel and the resulting deformation of the worm wheel, it is possible to prevent the steering feeling of the driver and the performance of the reducer from deteriorating.

In addition, in the reducer of an electric power steering apparatus, it is possible to prevent a clearance from being generated due to the wear and tear of the worm and the worm wheel, and to prevent rattle noise from being generated by backlash and a reverse input load.

BRIEF DESCRIPTION OF THE DRAWINGS

The above and other objects, features and advantages of the present disclosure will be more apparent from the following detailed description taken in conjunction with the accompanying drawings, in which.

DETAILED DESCRIPTION OF THE EXEMPLARY EMBODIMENTS

Hereinafter, embodiments will be described in detail with reference to the accompanying drawings. In adding reference numerals to elements in each drawing, the same elements will be designated by the same reference numerals, if possible, although they are shown in different drawings. Further, in the following description of the present disclosure, a detailed description of known functions and configurations incorporated herein will be omitted when it may make the subject matter of the present disclosure rather unclear.

In addition, terms, such as first, second, A, B, (a), (b) or the like may be used herein when describing components of the present disclosure. These terms are merely used to distinguish one structural element from other structural elements, and a property, an order, a sequence and the like of a corresponding structural element are not limited by the term. It should be noted that if it is described in the specification that one component is "connected," "coupled" or "joined" to another component, a third component may be "connected," "coupled," and "joined" between the first and second components, although the first component may be directly connected, coupled or joined to the second component.

Figure 1:
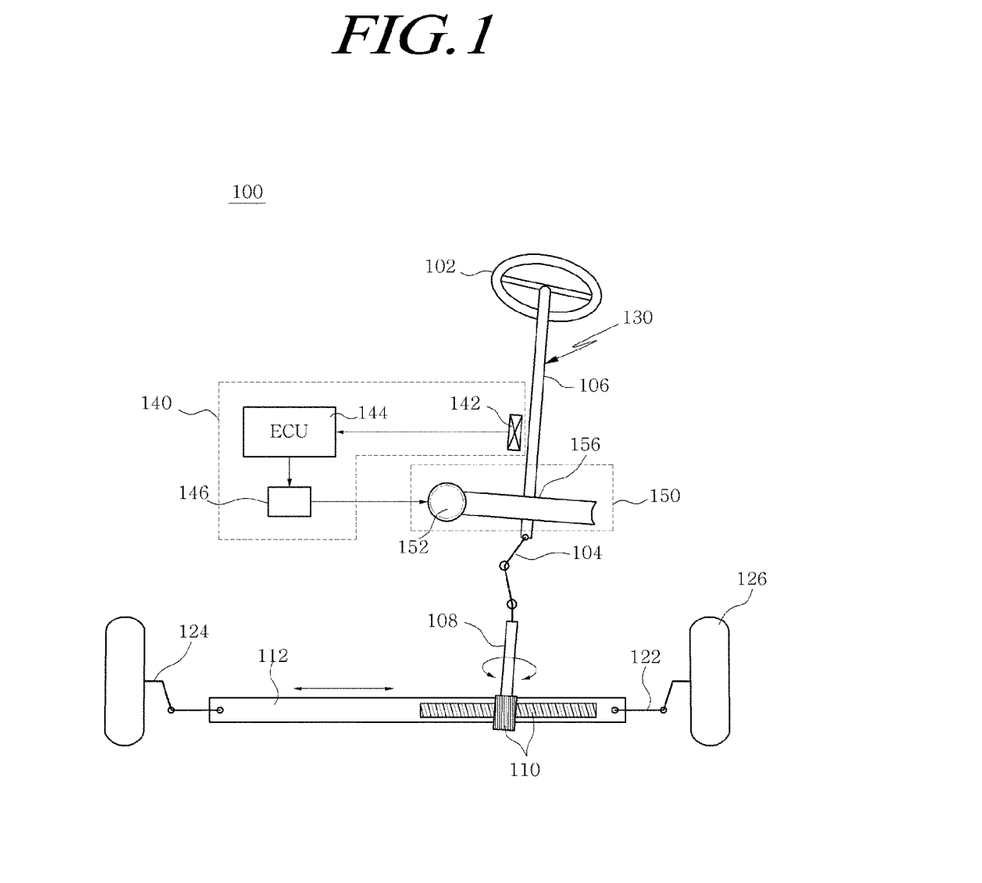
FIG. 1 is a view illustrating the configuration of an electric power steering apparatus.

FIG. 1 is a view illustrating the configuration of an electric power steering apparatus. As illustrated in FIG. 1, a conventional electric power steering apparatus 100 includes a steering system 130 that is continued from a steering wheel 102 to opposite vehicle wheels 126, and an assist power mechanism 140 configured to provide a steering assist power to the steering system 130.

The steering system 130 includes a steering shaft 106 that is connected, at one side, to the steering wheel 102 to be rotated with the steering wheel 102, and connected, at the other side, to a pinion shaft 108 via a pair of universal joints 104. In addition, the pinion shaft 108 is connected to a rack bar 112 through a rack and pinion mechanism 110, and the opposite ends of the rack bar 112 are connected to the vehicle wheels 126 through tie rods 122 and knuckle arms 124, respectively.

The assist power mechanism 140 includes: a torque sensor 142 configured to sense a torque that is applied to the steering wheel 102 by the driver and to output an electric signal that is proportional to the sensed torque; an electronic control unit 144 configured to generate a control signal based on the electric signal transferred from the torque sensor 142; a motor 146 configured to generate an assist power based on the control signal transferred from the electronic control unit 144; and a reducer 150 including a worm 152 and a worm wheel 156 in order to transmit the assist power generated by the motor 146 to the steering shaft 106.

Accordingly, the electric power steering apparatus is configured such that a torque generated by the rotation of the steering wheel 102 is transmitted to the rack bar 112 via the rack and pinion mechanism 110, and the assist power generated by the motor 146 according to the generated torque is transmitted to the rack bar 112.

That is, the torque generated by the rotation of the steering wheel 102 and the assist power generated by the motor 146 are combined with each other so as to cause the rack bar 112 to move in an axial direction.

Figure 2:
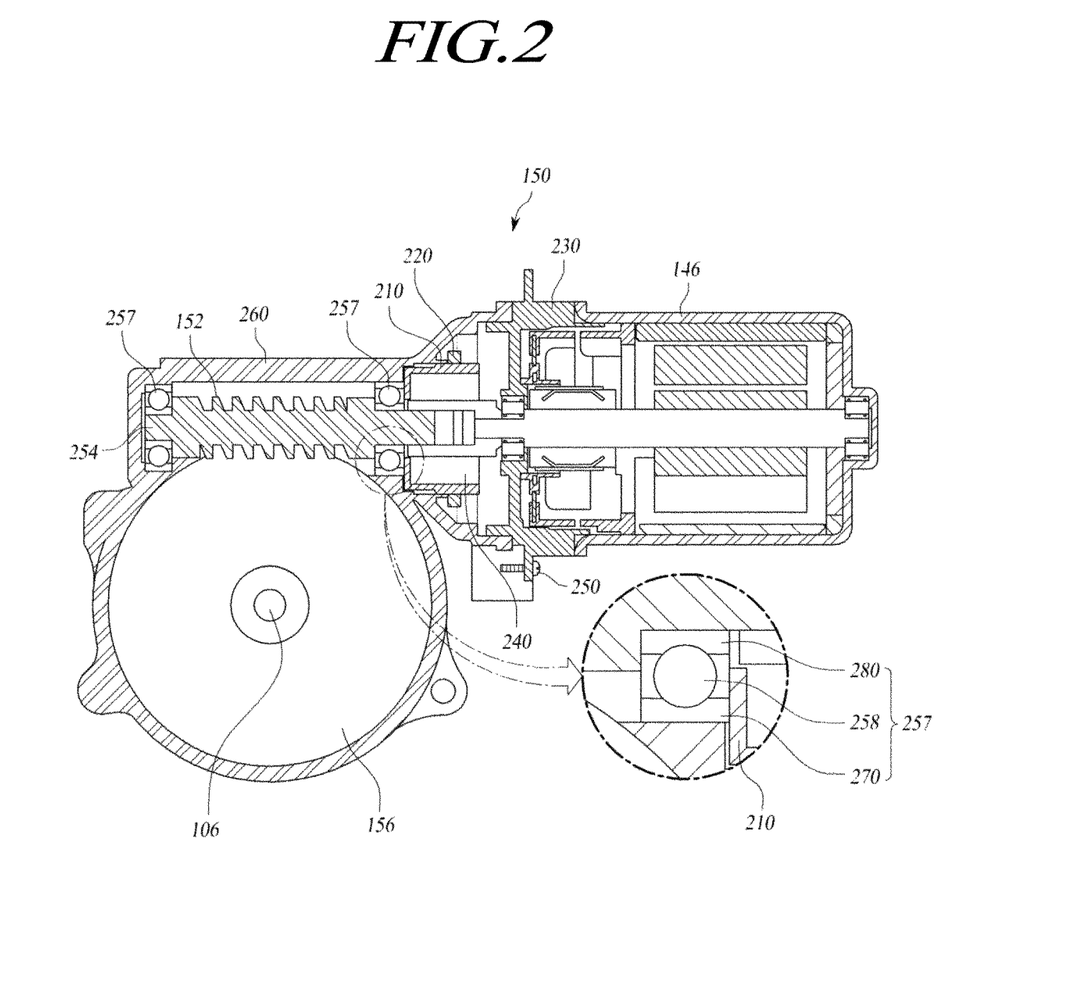
FIG. 2 is a cross-sectional view illustrating a reducer of an electric power steering apparatus.

FIG. 2 is a cross-sectional view illustrating a reducer of an electric power steering apparatus. As illustrated in FIG. 2, the reducer 150 is provided with a worm shaft 254 that is formed with a worm 152, and worm shaft bearings 257 are respectively provided at the opposite ends of the worm shaft 254 so as to support the worm shaft 254. In order to prevent the worm shaft bearings 257 from being loosened in the axial direction of the worm shaft 254, a plug bolt 210 is fastened between a damping coupler 240 and the worm shaft bearings 257, and the plug bolt 210 is fixed by a plug nut 220.

The worm shaft 254 has a structure in which the worm shaft 254 is connected with the motor 146 via the damping coupler 240 such that the worm shaft 254 is rotated by the driving of the motor 146.

In addition, a worm wheel 156 is provided at one side of the outer diameter of the worm 152 to be engaged with the worm 152 formed on the worm shaft 254. The worm wheel 156 is configured to transmit the torque of the worm shaft 254 applied by the driving of the motor 146 to the steering shaft 106 by being mounted on the steering shaft 106 configured to transmit the torque of the steering wheel 102 operated by the driver.

The worm 152, the worm wheel 156, and the like are provided within a gear housing 260, and the motor 146 is provided at one side of the gear housing 260 so as to provide a driving force to the worm shaft 254. The gear housing 260 and the motor 146 are coupled to each other by a motor cover 230 with a bolt 250.

In each of the worm shaft bearings 257, balls 258 are interposed between an inner race 280 and an outer race 270, thereby supporting the rotation of the worm shaft 254 connected to the motor 146 at the end of the gear housing 260.

The reducer of the electric power steering apparatus according to the embodiments includes a moisture absorption compensation member, which is supported on and coupled to the inner circumferential surface of the gear housing in the direction in which the worm shaft meshes with the worm wheel, and an elastic member, which is supported on and coupled to the inner circumferential surface of the gear housing in a direction opposite the direction in which the worm shaft meshes with the worm wheel, thereby minimizing the moisture absorption of the worm wheel and the increase of the torque due to moisture absorption of the worm wheel 156 and the resulting dimensional deformation of the worm wheel, and a clearance may be prevented from occurring due to the wear and tear of the worm and the worm wheel, thereby preventing rattle noise from being generated by backlash and a reverse input load.

Figure 3:
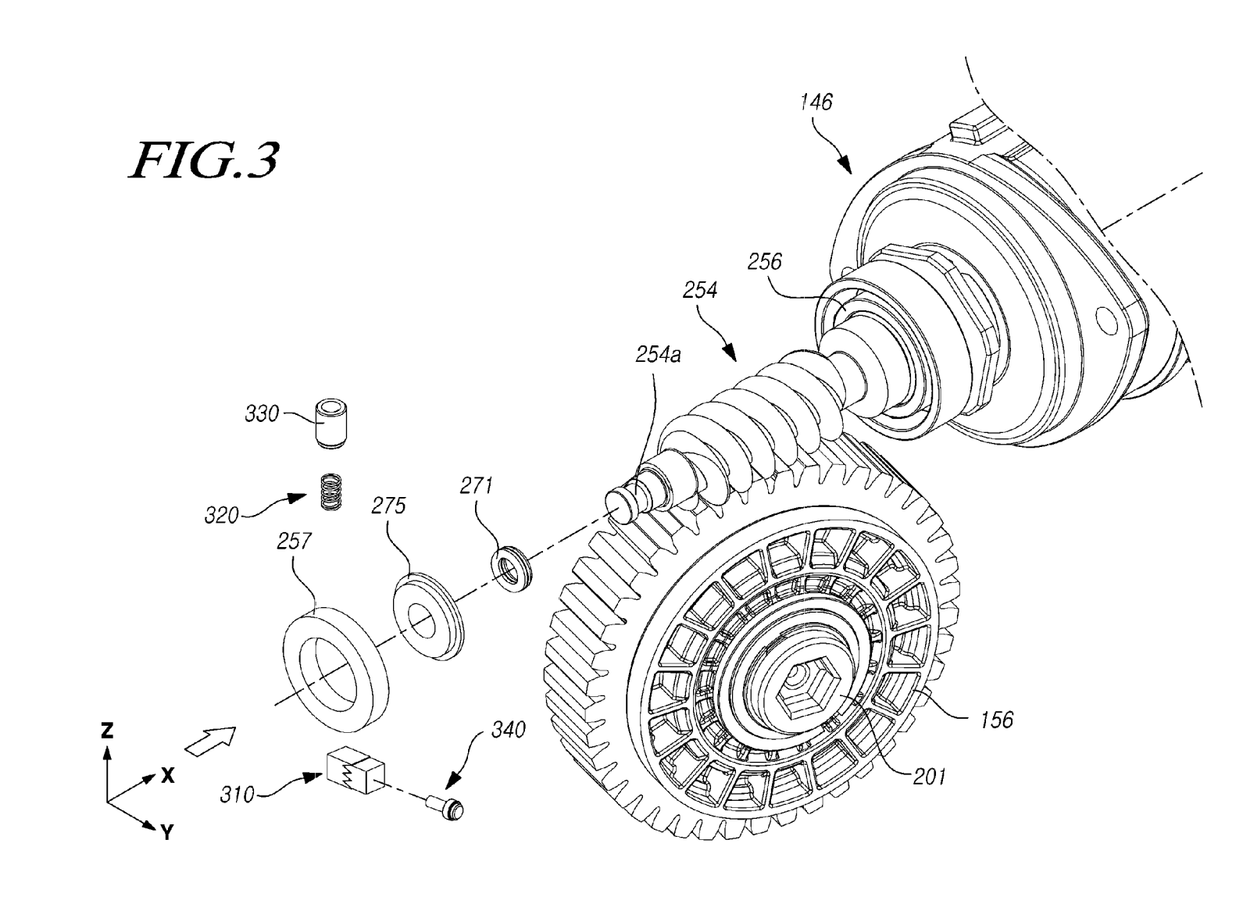
FIG. 3 is an exploded perspective view illustrating a reducer of an electric power steering apparatus according to the embodiments disclosed herein.
Figure 4:
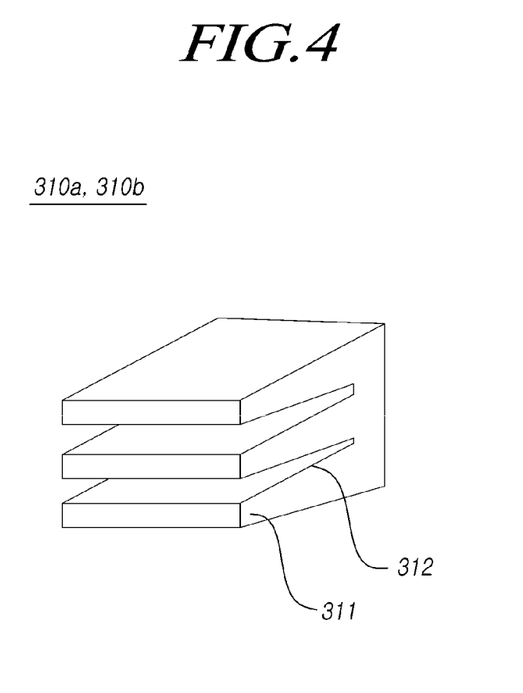
FIG. 4 is a perspective view illustrating a portion of the reducer of the electric power steering apparatus according to the embodiments.
Figure 5:
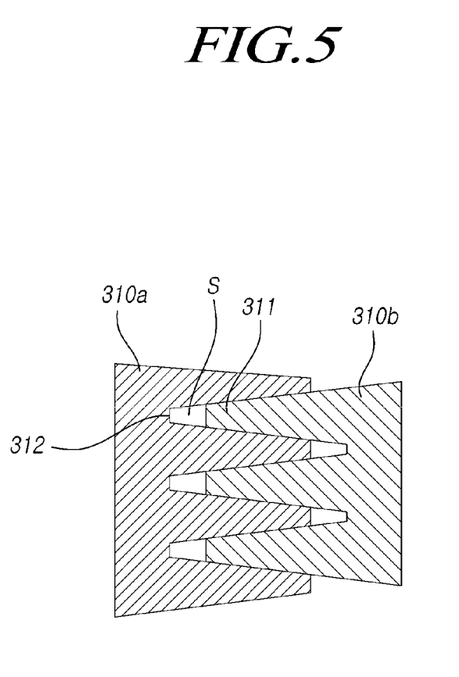
FIG. 5 is a cross-sectional view illustrating a portion of the reducer of the electric power steering apparatus according to the embodiments.
Figure 6:
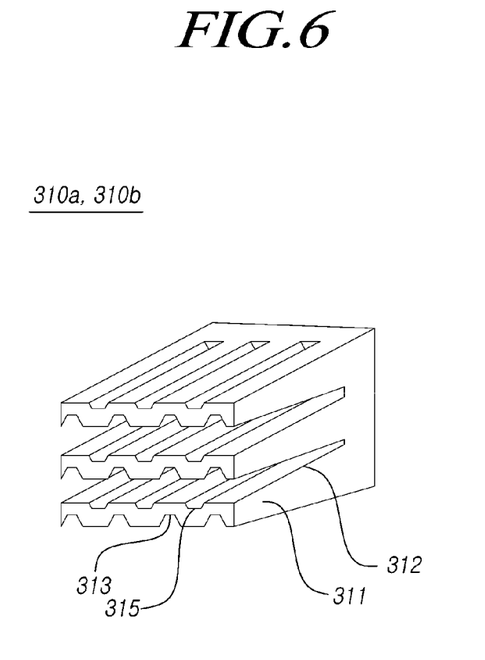
FIG. 6 is a perspective view illustrating a portion of the reducer of the electric power steering apparatus according to the embodiments.
Figure 7:
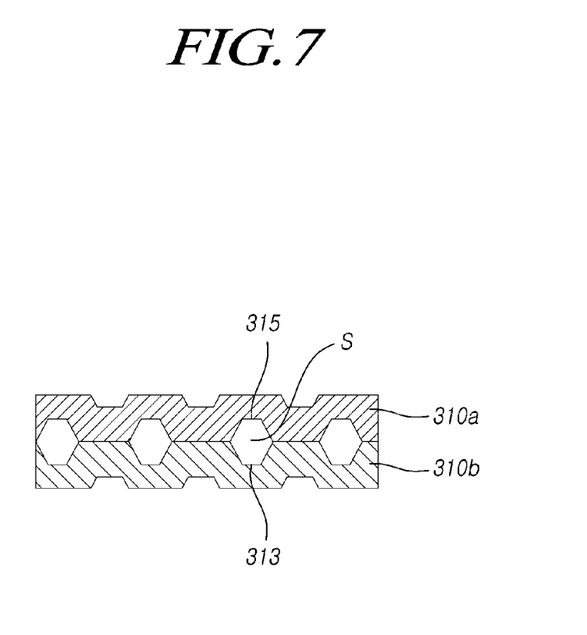
FIG. 7 is a cross-sectional view illustrating a portion of the reducer of the electric power steering apparatus according to the embodiments.
Figure 8:
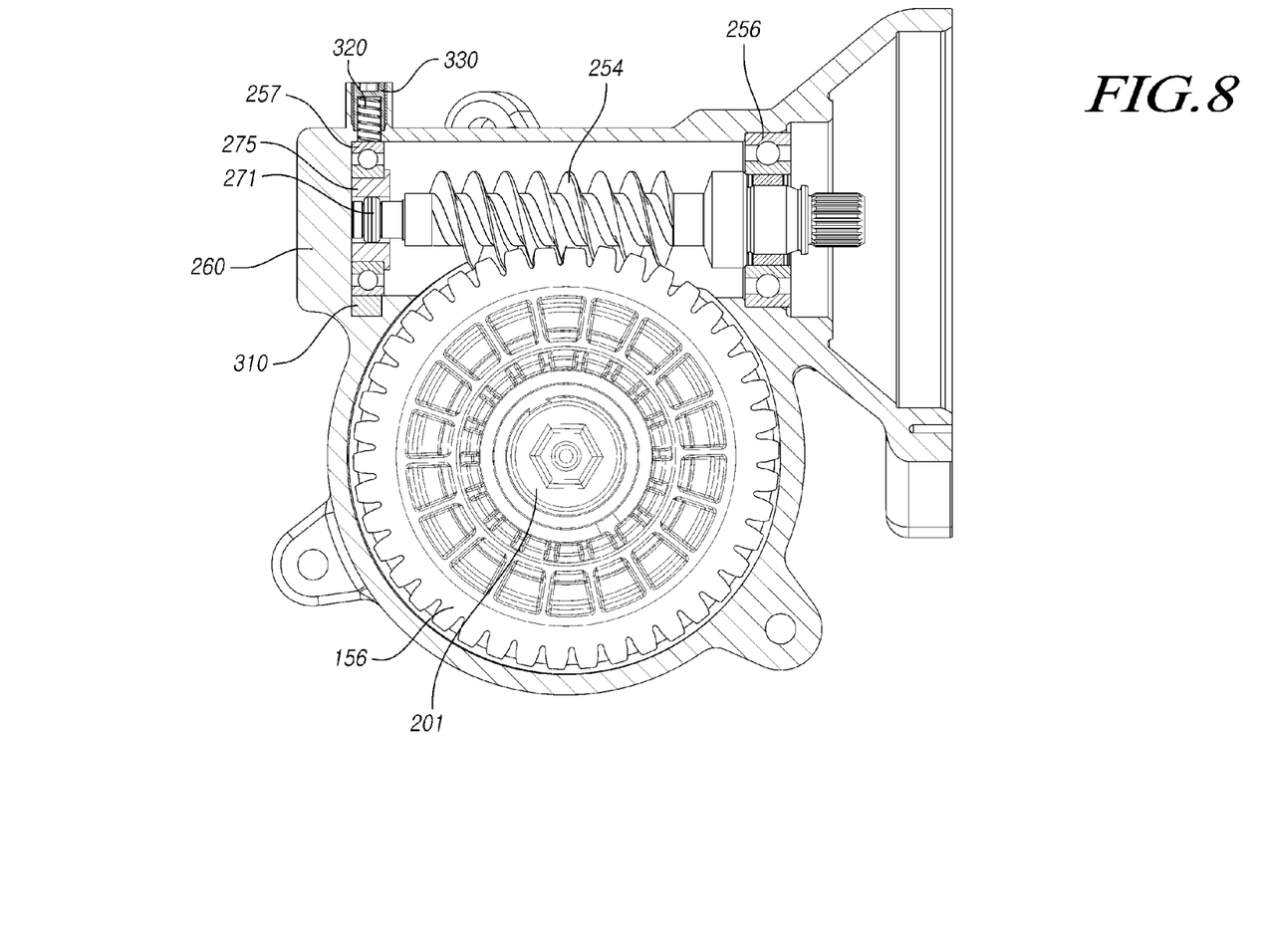
FIG. 8 is a cross-sectional view illustrating the reducer of the electric power steering apparatus according to the embodiments.
Figure 9:
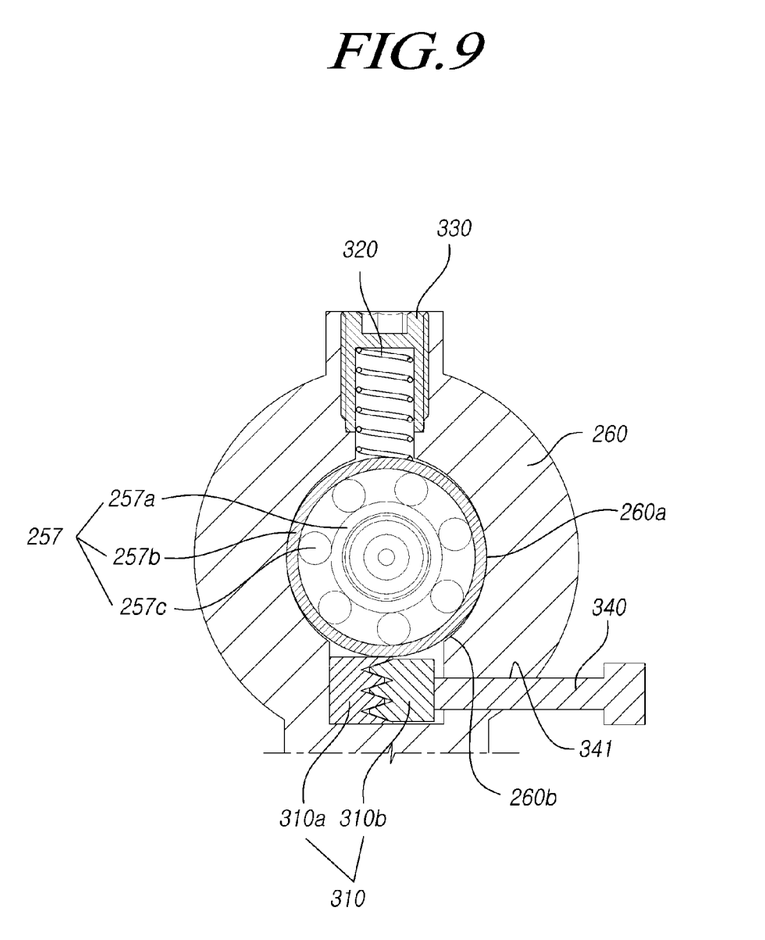
FIG. 9 is a cross-sectional view illustrating the reducer of the electric power steering apparatus according to the embodiments.

FIG. 3 is an exploded perspective view illustrating a reducer of an electric power steering apparatus according to the embodiments disclosed herein. FIG. 4 is a perspective view illustrating a portion of the reducer of the electric power steering apparatus according to the embodiments, FIG. 5 is a cross-sectional view illustrating a portion of the reducer of the electric power steering apparatus according to the embodiments, and FIG. 6 is a perspective view illustrating a portion of the reducer of the electric power steering apparatus according to the embodiments. FIG. 7 is a cross-sectional view illustrating a portion of the reducer of the electric power steering apparatus according to the embodiments, FIG. 8 is a cross-sectional view illustrating the reducer of the electric power steering apparatus according to the embodiments, and FIG. 9 is a cross-sectional view illustrating the reducer of the electric power steering apparatus according to the embodiments.

As illustrated in the drawings, a reducer of an electric power steering apparatus according the embodiments includes: a worm shaft 254 having a first end connected to a motor shaft and a second end that is opposite the first end, in which a first worm shaft bearing 256 and a second worm shaft bearing 257 are coupled to the first end and the second end, respectively; a gear housing 260 in which the first worm shaft bearing 256, the second worm shaft bearing 257, and the worm shaft 254 are housed; and a moisture absorption compensation member 310, which is supported on and coupled to an inner circumferential surface of the gear housing 260 in a direction in which the worm shaft 254 meshes with the worm wheel 156 and supports the worm shaft in a direction opposite the direction in which the worm shaft meshes with the worm wheel.

The reducer is configured such that the worm shaft 254 and the worm wheel 156 interlock with each other by the driving force of the motor 146 in order to rotate the steering shaft 201, thereby assisting the steering force of the driver. The first worm shaft bearing 256 and the second worm shaft bearing 257 are respectively fastened to the first end and the second end of the worm shaft 254, which are opposite each other, thereby supporting the rotation of the worm shaft 254 that interlocks with the shaft of the motor 146 when the motor 146 is driven.

The worm wheel 156 and the worm shaft 254, which interlock with the steering shaft 201, are housed in the gear housing 260 together with the first worm shaft bearing 256 and the second worm shaft bearing 257.

In addition, the second worm shaft bearing 257 is composed of an inner race 257a coupled to an end portion 254a of the worm shaft 254, balls 257c, and an outer race 257b. The moisture absorption compensation member 310 is supported and coupled between the inner circumferential surface of the gear housing 260 and the outer race 257b of the second worm shaft bearing 257 in the direction in which the worm shaft 254 meshes with the worm wheel 156 so that the moisture absorption compensation member 310 is capable of compensating for the amount of expansion of the worm wheel 156, which is caused due to moisture absorption.

In addition, an elastic member 320 is supported and coupled between the inner circumferential surface of the gear housing 260 and the outer race 257b of the second worm shaft bearing 257 in a direction opposite the direction in which the worm shaft 254 meshes with the worm wheel 156, that is, the position where the moisture absorption compensation member 310 is coupled, so that the elastic member 320 is capable of absorbing impact and rattle noise while compensating for the clearance between the worm shaft 254 and the worm wheel 156.

The cap member 330 may be coupled to the gear housing 260 in order to prevent the elastic member 320 from being separated from the gear housing 260. The cap member 330 may be formed to be screw-coupled to the gear housing 260, so that the elastic supporting force of the elastic member 320 can be adjusted depending on an screw fastening amount and the assemblability of the elastic member 320 can be improved.

Here, the moisture absorption compensation member 310 is made of a plastic material that is the same as the plastic material of the worm wheel 156 in terms of an amount of moisture absorption expansion, so that the moisture absorption compensation member 310 is also expanded by an amount corresponding to the expansion amount of the worm wheel 156.

That is, in the case in which the vehicle is operated in a high temperature and high humidity environment, when the worm wheel 156 formed of a plastic material absorbs moisture in the surrounding air and expands so that the size of the worm wheel 156 changes, the moisture absorption compensation member 310 may also absorb moisture so as to be equally expanded, thereby pushing the second worm shaft bearing 257 and the worm shaft 254 to a side that is opposite the worm wheel 156 so that the elastic member 320 is compressed and as a result, an excessive coupling force will not be generated between the worm shaft 254 and the worm wheel 156.

Therefore, the moisture absorption compensation member 310 absorbs the expansion amount that is the same as the expansion amount of the worm wheel 156, so that the supporting force of the worm shaft 254 and the worm wheel 156 is maintained at the same supporting force as that applied before the moisture absorption. Thus, the excessive torque increase between the worm shaft 254 and the worm wheel 156 may be minimized, and as a result, the steering feeling is prevented from deteriorating.

The moisture absorption compensation member 310 may be formed of one or more materials selected from a group consisting of polyamide 6, polyamide 66, polyamide 46, and polyamide 12.

In addition, the moisture absorption compensation member 310 is assembled with the gear housing 260 in the state where wedge-shaped first and second compensation members 310a and 310b form a pair and are engaged with each other.

First, as illustrated in FIG. 4, the first compensation member 310a includes a plurality of protrusions 311 formed in a wedge shape and grooves 312 each formed between the protrusions 311 in a shape of being disposed to be connected to the second worm shaft bearing 257 in the direction of the gear housing 260.

In addition, the second compensation member 310b is formed in as a pair with the first compensation member 310a so that the protrusions 311 and the grooves 312 of the second compensation member 310b are engaged with the grooves 312 and the protrusions 311 of the first compensation member 310a, respectively.

In addition, as illustrated in FIG. 5, in the state in which the first compensation member 310a and the second compensation member 310b are engaged with each other, a space S is provided between the tip ends of the protrusions 311 and the inner ends of the grooves 312 so that the contact area between the first and second compensation members 310a and 310b and the ambient air is increased and as a result, moisture absorption and expansion of the moisture absorption compensation member 310 may be performed excellently.

In addition, as illustrated in FIGS. 6 and 7, the first compensation member 310a and the second compensation member 310b may include one or more rail grooves 313 and 315 formed on one or both of first and second sides of each of the protrusions 311, which are opposite each other. Since the rail grooves 313 and 315 are provided in this way, the contact area between the moisture absorption compensation member 310 and the ambient air is increased so that the moisture absorption and expansion of the moisture absorption compensation member 310 may be performed excellently.

In addition, as illustrated in FIG. 7, the first compensation member 310a and the second compensation member 310b are disposed such that the rail grooves 315 of the first compensation member 310a and the rail grooves 313 of the second compensation member 310b stacked one on another at a position where the rail grooves 315 of the first compensation member 310a and the rail grooves 313 of the second compensation member 310b correspond to each other in the state in which the first compensation member 310a and the second compensation member 310b are engaged with each other. As a result, the space S is formed between the rail grooves 315 and 313 so that the contact area with the ambient air is increased, and as a result, moisture absorption and expansion may be performed excellently.

Because the volume of the moisture absorption compensation member 310 is much smaller than that of the worm wheel 156 and the moisture absorption compensation member 310 is also assembled in a narrower space than the worm wheel 156, it is possible to prevent the expansion amount of the moisture absorption compensation member 310 from being reduced compared to the expansion amount of the worm wheel 156.

Meanwhile, an adjustment member 340 may be coupled to a fastening hole 341 formed in the gear housing 260 in order to adjust the upper and lower support forces of the moisture absorption compensation member 310 and the elastic member 320, so that the first compensation member 310a and the second compensation member 310b can be supported in the direction in which the first compensation member 310a and the second compensation member 310b are engaged with each other.

That is, as in the coordinate axes illustrated in FIG. 3, the direction of the worm shaft 254 is set to the X axis, the direction perpendicular to the worm shaft 254 and interconnecting the centers of the worm shaft 254 and the worm wheel 156 is set to the Z axis, the direction perpendicular to the X axis and the Z axis is set to the Y axis, it is possible to adjust the insertion depth of the first compensation member 310a and the second compensation member 310b depending on the fastened depth of the adjustment member 340 into the fastening hole as in FIG. 6 that illustrates a plane perpendicular to the X axis.

In addition, the mounting surface of the gear housing 260 to which the second worm shaft bearing 257 is coupled is formed such that the clearance of the mounting surface 260b in the vertical direction where the worm shaft 254 and the worm wheel 156 mesh with each other is larger than that of the mounting surface 260a in the left and right direction so that the second worm shaft bearing is movable in the vertical direction.

Accordingly, when the operator adjusts the fastening amount of the adjusting member 340, the vertical position of the first worm shaft bearing 256 is set, and at the same time, the elastic supporting force of the elastic member 320 is also adjusted.

According to the embodiments having the shape and configuration described above, in the reducer of the electric power steering apparatus, it is possible to prevent the steering feeling of the driver and the performance of the reducer from deteriorating by minimizing an increase in torque due to moisture absorption of the worm wheel 156 and the resulting dimensional deformation of the worm wheel.

In addition, it is possible to prevent a clearance from being generated due to the wear and tear of the worm and the worm wheel, and to prevent rattle noise from being generated by backlash and a reverse input load.

Although all the elements constituting embodiments of the present disclosure have been described above as being combined into a single unit or combined to be operated as a single unit, the present disclosure is not necessarily limited to such embodiments. That is, at least two elements of all structural elements may be selectively joined and operate without departing from the scope of the present disclosure.

In addition, since terms, such as "including," "comprising," and "having" mean that one or more corresponding components may exist unless they are specifically described to the contrary, it shall be construed that one or more other components can be included. All the terms that are technical, scientific or otherwise agree with the meanings as understood by a person skilled in the art unless defined to the contrary. Common terms as found in dictionaries should be interpreted in the context of the related technical writings not too ideally or impractically unless the present disclosure expressly defines them so.

The above embodiments have been described merely for the purpose of illustrating the technical idea of the present disclosure, and those skilled in the art will appreciate that various modifications and changes are possible without departing from the scope and spirit of the present disclosure. Therefore, the embodiments disclosed in the present disclosure are intended to illustrate the scope of the technical idea of the present disclosure, and the scope of the present disclosure is not limited by the embodiment. The scope of the present disclosure shall be construed on the basis of the accompanying claims in such a manner that all of the technical ideas included within the scope equivalent to the claims belong to the present disclosure.

What is claimed is:

1. A reducer of an electric power steering apparatus, the reducer comprising:
   a worm shaft having a first portion connected to a motor shaft and a second portion that is opposite the first portion, a first worm shaft bearing and a second worm shaft bearing being coupled to the first end and the second end, respectively;
   a gear housing in which the first worm shaft bearing, the second worm shaft bearing, and the worm shaft are housed; and
   a moisture absorption compensation member which is disposed on an inner circumferential surface of the gear housing and supports the worm shaft in a direction opposite to a direction in which the worm shaft meshes with a worm wheel, wherein the moisture absorption compensation member comprises a first compensation member and a second compensation member having wedge shapes to be engaged with each other.

2. The reducer of claim 1, further comprising: an elastic member which is supported on and coupled to an inner circumferential surface of the gear housing in the direction opposite to the direction in which the worm shaft meshes with the worm wheel and supports the worm shaft toward the moisture absorption compensation member.

3. The reducer of claim 2, further comprising:
   a cap member coupled to the gear housing so as to prevent the elastic member from being separated.

4. The reducer of claim 2, wherein the moisture absorption compensation member is made of a plastic material having an amount of hygroscopic expansion that is equal to an amount of hygroscopic expansion of a plastic material that forms the worm wheel.

5. The reducer of claim 2, wherein the moisture absorption compensation member is formed of one or more materials selected from a group consisting of polyamide 6, polyamide 66, polyamide 46, and polyamide 12.

6. The reducer of claim 1, wherein:
   the first compensation member having comprises a plurality of protrusions each formed in a wedge shape and a plurality of grooves each formed between the protrusions and connected to the second worm shaft bearing in a direction of the gear housing; and
   the second compensation member is formed in a pair with the first compensation member such that the protrusions and the grooves of the second compensation member are engaged with the grooves and the protrusions of the first compensation member, respectively.

7. The reducer of claim 6, wherein, in a state where the first compensation member and the second compensation member are engaged with each other, a space is provided between tip ends of the protrusions and inner ends of the grooves.

8. The reducer of claim 6, wherein each of the first compensation member and the second compensation member includes one or more rail grooves formed on one or both of first and second sides of each of the protrusions, which are opposite each other.

9. The reducer of claim 8, wherein the first compensation member and the second compensation member are disposed such that the rail grooves of the first compensation member and the rail grooves of the second compensation member are stacked one on another at a position where the rail grooves of the first compensation member and the rail grooves of the second compensation member correspond to each other in a state in which the first compensation member and the second compensation member are engaged with each other.

10. The reducer of claim 9, further comprising:
an adjustment member coupled to a fastening hole formed in the gear housing and configured to support the first compensating member or the second compensating member in a direction in which the first compensation member and the second compensation member are inserted into each other.

11. The reducer of claim 1, wherein the first and second compensation members of the moisture absorption compensation member comprise protrusions protruding in a direction perpendicular to the direction in which the worm shaft meshes with the worm wheel.

12. The reducer of claim 1, wherein:
the first compensation member comprises a plurality of protrusions and grooves; and
the second compensation member has a shape engaged with the protrusions and grooves of the first compensation member.

* * * * *